Figure 1:
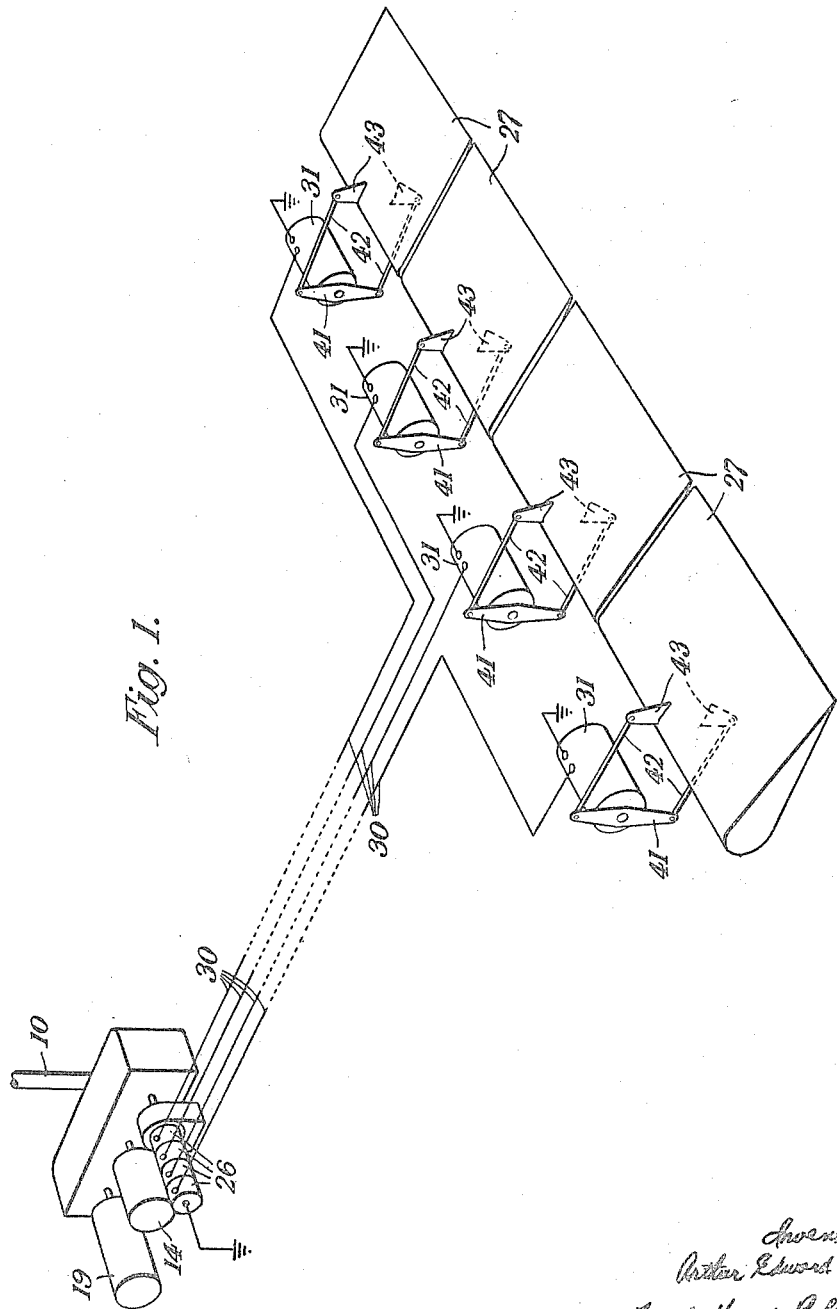

Sept. 22, 1953     A. E. SWAIN ET AL     2,652,995
FLYING CONTROLS FOR AIRCRAFT

Filed May 12, 1949     2 Sheets-Sheet 2

Patented Sept. 22, 1953

2,652,995

UNITED STATES PATENT OFFICE 2,652,995

FLYING CONTROLS FOR AIRCRAFT

Arthur Edward Swain, East Cowes, and Frank Henry Robertson, Carisbrooke, Isle of Wight, assignors to Saunders-Roe Limited, East Cowes, Isle of Wight, England, a British company Application May 12, 1949, Serial No. 92,794
In Great Britain May 18, 1948

6 Claims. (Cl. 244—83)

This invention relates to power-operated control systems for the control surfaces of aircraft, that is to say the elevator, rudder and ailerons, and has for its object to safeguard the system against the consequence of failure of a power unit. Such control surfaces, unlike flaps to which the invention does not relate, must be capable of movement under the control of a pilot to a large number of different positions, as distinct from merely from an up to a down position, and where reliance is placed upon power units to operate them, such power units must be capable not only of moving the control surfaces to positions selected by the pilot but also of moving them at a rate determined by the rate at which the pilot moves his control column or rudder bar.

In our U. S. Patent No. 2,517,680 we have described a power operated flying control system for aircraft comprising, in combination with a pilot's control member and a control surface to be operated thereby, a torque shaft, an irreversible mechanical driving gear located adjacent the control surface for imparting movement from the torque shaft to the control surface, a pair of power units arranged to drive the torque shaft through a differential gear, each power unit being linked to the control member, being arranged, through the differential gear and torque shaft, to position the control surface in accordance with the position of the control member and being a variable speed power unit so that, when the control member is displaced, it will move the control surface at a rate corresponding to the rate of movement of the control member, and means for preventing reverse rotation of either power unit, should it fail, by the other power unit.

The present invention provides, in an aircraft, a power operated flying control system comprising, in combination with a pilot's control member, a control surface split into a number of individually operable sections, and a number of independent variable speed power units, one for operating each section, each power unit being linked to the control member and being arranged, on displacement of the control member, to position the associated section of the control surface in accordance with the position of the control member and to move that section of the control surface at a rate corresponding to the rate of movement of the control member.

The power units are preferably located close to the control surface. They may be operated directly by the pilot's control member, but in the case of large aircraft it is preferred to operate the power units by master and slave units, each comprising a transmitter connected to the control member and a remote receiver located adjacent the power unit, the receiver following the movement imparted to the transmitter. The receivers may be operated mechanically or hydraulically by the transmitters, but we prefer to employ electrical operation, the sole connections between the transmitters and the receivers being electric cables.

The arrangement according to the invention has the advantage that a safeguard against failure is provided without duplication of the power units, each power unit being subdivided into a number of smaller ones, one for each section of the control surface, of aggregate power sufficient to operate the control surface. It has the advantage of great reliability, in that no single failure, whether of a power unit or the connections between a power unit and the control member or the associated section of the control surface, can put the system out of action. Any such single failure will disable one section only of the control surface, the other sections remaining operable. Moreover, where the power units are of the electrically operated master and slave type, there is no necessity to provide mechanical torque shafting and associated gear boxes for imparting movement from the power units to the control surface.

The connection between each power unit and the section of the control surface which it operates may advantageously be by way of a reduction gear of fairly high ratio, e. g. of the order of 200 to 1. Such a gear will have sufficient damping effect to prevent flutter of its associated section of the control surface in the event of failure of the power unit, but, since it is not irreversible, will under these conditions allow the section of the control surface to float to its "no-lift" position.

A further object of the invention is to provide a simplified method of trimming. In accordance, therefore, with a further feature of the invention the control member serves to rotate a shaft connected to one sun-wheel of a differential gear, the other sun-wheel of which is connected to a feel generator or other self-centering device, for example a feel generator as described in U. S. Patent No. 2,508,883. Relative angular displacement of the shaft associated with the control member and that associated with the feel generator may thus be effected by rotation of the planet-carrier of the differential gear. This rotation may conveniently be caused by the provision of a worm drive for the planet-carrier.

A preferred flying control system according to the invention will now be described in detail, by way of example, with reference to its application to the control of an elevator divided into four sections, but it will be understood that an exactly similar system may be used in conjunction with any other of the control surfaces, i. e. the rudder and ailerons, and that these may be divided into any convenient number of sections.

Figure 2:
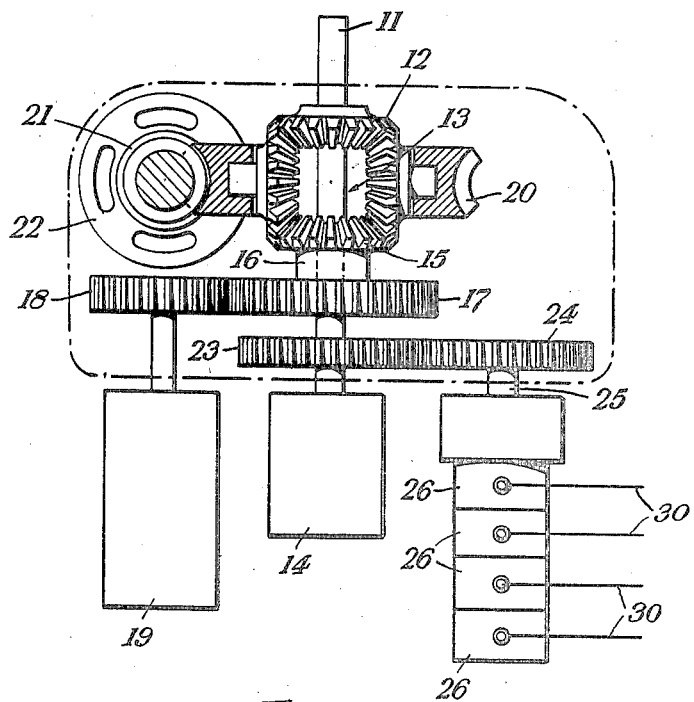
Figure 3:
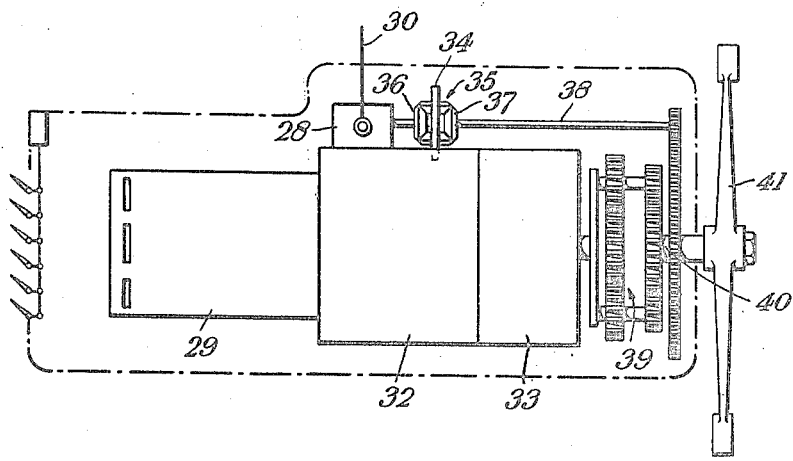

The preferred system in question is shown in the accompanying drawings, in which:

Fig. 1 is a diagrammatic lay-out of the complete system insofar as it relates to the elevator, Fig. 2 is a sectional plan through the mechanism associated with the pilot's control column, and Fig. 3 is a plan view of one of the power units and associated receiver and gearing.

The pilot's control column 10 (Fig. 1) is fixed to a shaft 11 (Fig. 2), so that fore and aft movement of the control column 10 will rotate the shaft. To the shaft 11 is fixed a gear wheel 12 constituting one sun wheel of a differential gear 13. The shaft 11 extends through the differential gear and at its lower end, as seen in Fig. 2, it is connected to the servomotor 14 of an automatic pilot for alternative control. The second sun-wheel 15 of the differential gear is mounted on a sleeve 16 free to turn on the shaft 11, the sleeve 16 being geared by gears 17, 18, to a feel generator 19 which may be of the kind described in U. S. Patent No. 2,508,883. The planet-carrier 20 of the differential gear is constituted by a worm wheel meshing with a worm 21 driven by a split-series electric motor 22. This motor is controlled to run in either direction by a two-way switch (not shown), operation of the switch causing the planet-carrier 20 to rotate and thus to provide a relative angular displacement between the two sun wheels 12, 15. This in its turn produces a relative displacement between the control column 10 and the feel generator 19 and when the desired amount of trim has been obtained the switch is operated to stop the motor. The worm drive being irreversible the planet-carrier is thus held in position until the switch is again operated to readjust the trim.

The shaft 11 is connected, through gears 23, 24 to a shaft 25 operating four Selsyn transmitters 26, so that the actuating member of each transmitter receives a movement corresponding in magnitude and direction to that of the control column 10. The transmitters are electrically connected, by cables 30, to four Selsyn receivers each located adjacent one of four power units 31 (see Fig. 1), each of which in turn is mounted close to and serves to operate one section 27 of the elevator. The Selsyn receivers, one of which is shown at 28 in Fig. 3, of course, execute movements identical, in magnitude and direction, with those imparted to their respective transmitters 26.

Each power unit, as in the case of the arrangement described in U. S. Patent No. 2,517,680 comprises a constant speed electric motor 29 (Fig. 3) which runs continuously to drive a variable delivery hydraulic pump 32; this pump 32 drives a hydraulic motor 33, and this in its turn operates one of the sections 27 of the elevator. The hydraulic pump 32 is of the swashplate type and its delivery mechanism is controlled by the planet carrier 34 of a differential gear 35, one sun wheel 36 of which is driven by the associated receiver 28 and the other sun wheel 37 of which is driven by a feedback shaft 38 from the output side of the hydraulic motor 33, the shaft 38 and sun wheel 37 constituting a follow-up mechanism.

Normally, when the elevator is stationary, there is no delivery from the pump 32 and the hydraulic motor 33 is, of course, stationary. As soon as the control column 10 is moved the receiver 28 is caused to execute a corresponding movement and turns the first sun wheel 36. Since the follow-up mechanism, and thus the second sun-wheel 37, are stationary the effect is to turn the planet-carrier 34 and thus to move a lever (not shown) to start delivery in the appropriate direction from the pump. This causes the hydraulic motor to start and to drive, at a speed determined by the rate of movement of the control column, the associated section 27 of the elevator through a 200:1 reduction gear 39 of the vernier epicyclic type. On the driven shaft 40 of this gear is mounted a double lever 41 (see also Fig. 1) having at each end a link 42 connecting it to the ends of a similar lever 43 attached to the section 27 of the elevator and mounted to turn about the pivotal axis of the section. Rocking of the driven shaft 40 thus causes corresponding rocking of the section 27 of the elevator and also actuates, through gears 44, 45 the feed back shaft 38, thus causing the second sun-wheel 37 of the differential gear to rotate. Since the first sun-wheel 36 is now stationary, the effect is again to rotate the planet-carrier 34, the gearing of the follow-up mechanism being such as to make the rotation opposite to its original direction. The delivery of the pump is gradually reduced and, when movement of the elevator section 27 corresponding to that of the control column 10 has been produced, the delivery is stopped and movement ceases.

When the aircraft is parked on the ground the control surfaces are free to move and it is necessary to provide a lock. For this purpose a lock is provided on each section of each control surface and is urged into the operative position by a spring. A solenoid is also provided of sufficient strength to overcome the action of the spring. Under normal operating conditions the solenoid is excited and the lock is held off against the action of the spring, but as soon as the aircraft is parked excitation is removed from the solenoid and the lock is moved into the operative position. As an alternative to applying the solenoid operated lock to the section of the control surface, it could be fitted to the reduction gear or to the linkage connecting the section to the reduction gear.

The solenoid operated lock being of conventional character is not illustrated in the drawings.

It will be appreciated that the individual power units for operating the ailerons and the rudder will be respectively operated, through similar electric remote control systems of the Selsyn type, by lateral movement of the control column and by the rudder bar.

What we claim as our invention and desire to secure by Letters Patent is:

1. In a power operated flying control system for aircraft comprising a power unit, a pilot's control member for actuating said power unit to displace a control surface to a position selected by said control member, a differential gear comprising two sun wheels and a planet carrier, one of said sun wheels being coupled to said operating member for rotation thereby, a device coupled to the other sun wheel for rotation thereby and serving to impose resistance to movement of said operating member which increases with displacement of said operating member from a neutral position, and a trimming device which is operable to rotate said planet carrier and thereby to effect relative angular adjustment of the two sun wheels.

2. In a power operated flying control system for aircraft comprising a power unit, a pilot's control member for actuating said power unit to displace a control surface to a position selected by said control member, a differential gear comprising two sun wheels and a planet carrier, one of said sun wheels being coupled to said operating member for rotation thereby, a device coupled to the other sun wheel for rotation thereby and serving to impose resistance to movement of said operating member which increases with displacement of said operating member from a neutral position, a trimming motor, and a worm drive connecting said trimming motor and said planet carrier.

3. In an aircraft, the combination of a control surface subdivided into at least three closely adjacent sections separately hinged to the aircraft structure, a corresponding number of individually operable variable speed power units, a rotary output shaft associated with each power unit, a lever associated with each output shaft and arranged to receive rocking movement therefrom, a linkage coupling each of said levers to one of said sections of the control surface and effective to produce pivotal movement of said section when said lever is rocked, and means operable by the pilot for actuating all of said power units simultaneously and at a speed selected by the pilot to move through said output shafts, levers and linkages all of said sections simultaneously to a position selected by the pilot.

4. In an aircraft, the combination of a control surface subdivided into at least three closely adjacent sections separately hinged to the aircraft structure, a corresponding number of variable speed power units, each having a rotary output shaft, said power units being respectively allocated one to each of said sections of the control surface, a high ratio reduction gear between each power unit and its associated output shaft, and means operable by the pilot for actuating all of said power units simultaneously and at a speed selected by the pilot to move, through said reduction gears and output shafts, all of said sections simultaneously to a position selected by the pilot, each of said reduction gears being effective to prevent flutter of the associated section of the control surface in the event of failure of the power unit by which it is driven, while nevertheless then permitting said control surface to float to a no-lift position.

5. In an aircraft, the combination of a control surface subdivided into at least three closely adjacent sections independently hinged to the aircraft structure, a corresponding number of independent variable speed electro-hydraulic power units, one mounted adjacent to each section of the control surface, means coupling each of said power units to the associated section of the control surface, a pilot's control column, a feel generator for imposing resistance to movement of said control column, a plurality of electrical transmitters coupled to said control column, so that each transmitter receives a movement corresponding in magnitude and direction to that of the control column, a plurality of electrical receivers each located adjacent to one of the power units, a cable directly connecting each receiver to one of said transmitters, said receivers being arranged to execute movements identical with those of their respective transmitters and to actuate said power units to move said sections simultaneously at a speed and to a position selected by the movement imparted to said control column.

6. In an aircraft, the combination of a control surface subdivided into at least three closely adjacent sections independently hinged to the aircraft structure, a corresponding number of independent variable speed electro-hydraulic power units, one mounted adjacent to each section of the control surface, means coupling each of said power units to the associated section of the control surface, a pilot's control column, a feel generator for imposing resistance to movement of said control column, and means operable by movement of said control column, for operating all of said power units simultaneously and at a speed selected by the pilot to move all of said sections simultaneously to a position selected by the pilot.

ARTHUR EDWARD SWAIN.
FRANK HENRY ROBERTSON.

References Cited in the file of this patent

UNITED STATES PATENTS

| Number | Name | Date |
|---|---|---|
| 2,360,333 | De Port | Oct. 17, 1944 |
| 2,376,320 | Butrovich et al. | May 22, 1945 |
| 2,412,027 | Alexanderson | Dec. 3, 1946 |
| 2,450,907 | Newton et al. | Oct. 12, 1948 |
| 2,526,252 | Mercier | Oct. 17, 1950 |

FOREIGN PATENTS

| Number | Country | Date |
|---|---|---|
| 582,380 | Great Britain | Nov. 13, 1946 |
| 627,858 | Great Britain | Aug. 17, 1949 |